Nov. 16, 1971
W. E. ROHDE
3,619,994
MANUALLY DIRECTED COTTON HARVESTING MACHINE
Filed Dec. 4, 1969
2 Sheets-Sheet 1
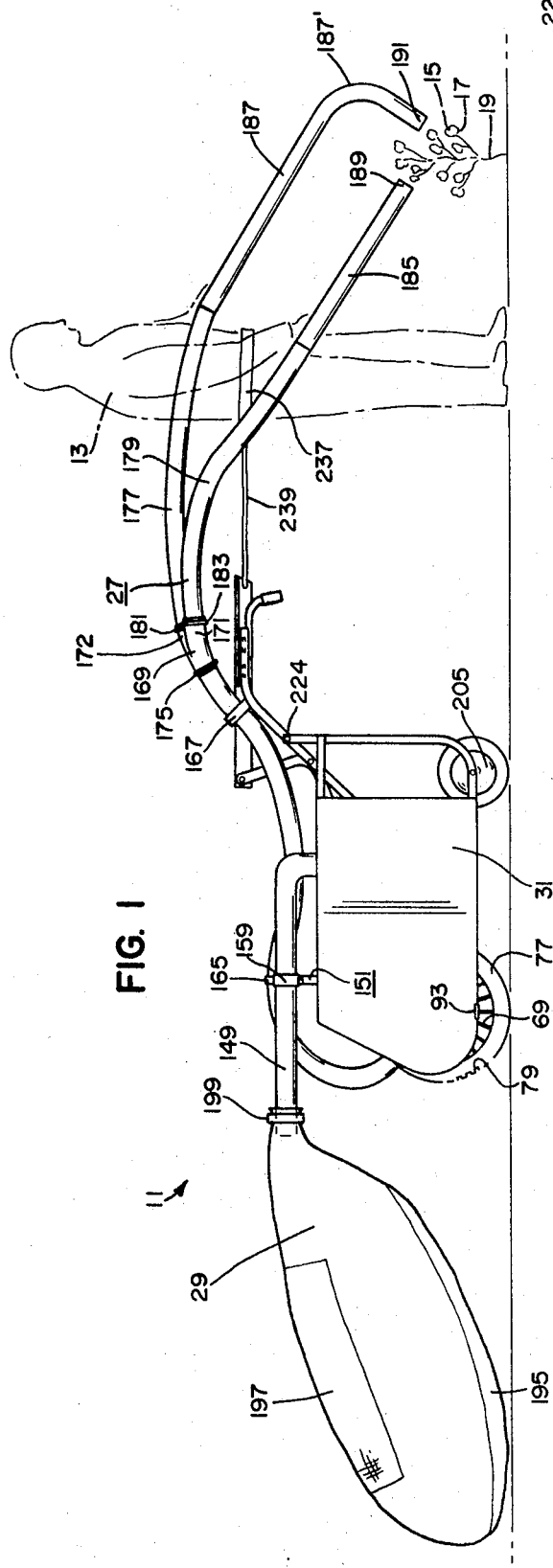
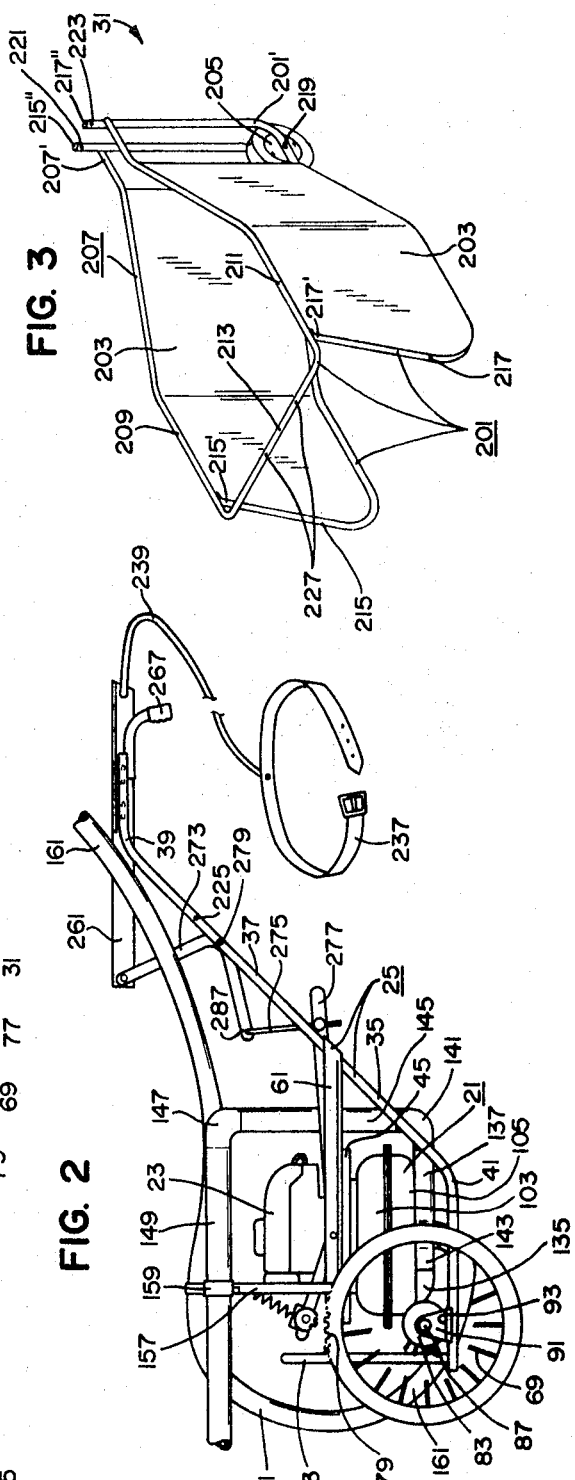
INVENTOR.
WILLIAM E. ROHDE
BY *John R. Walker, III*
  *Attorney*

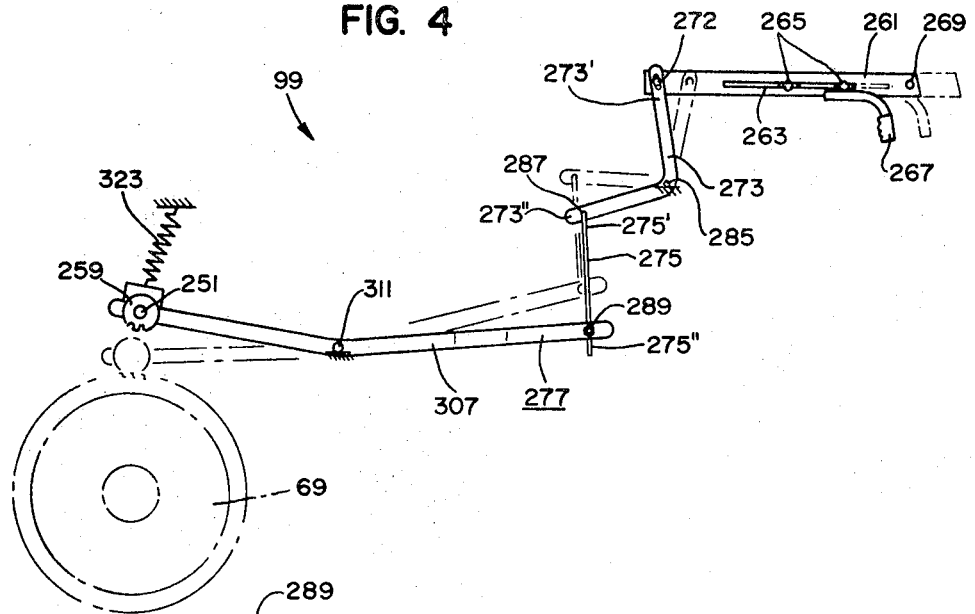
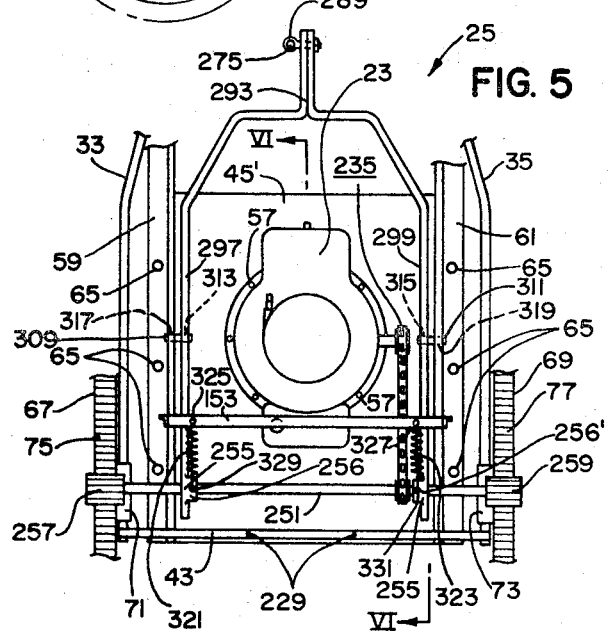
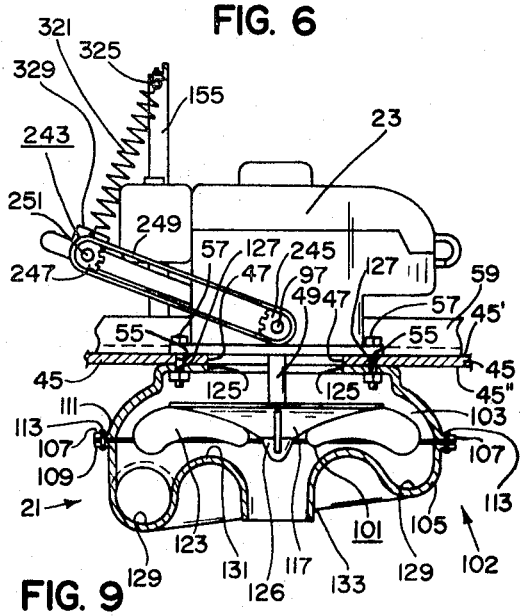
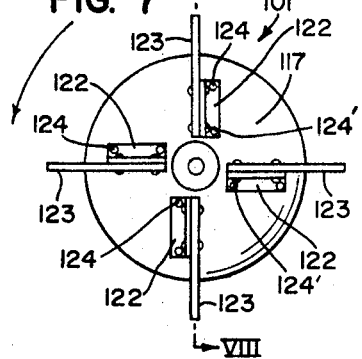
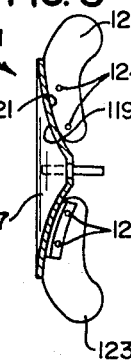
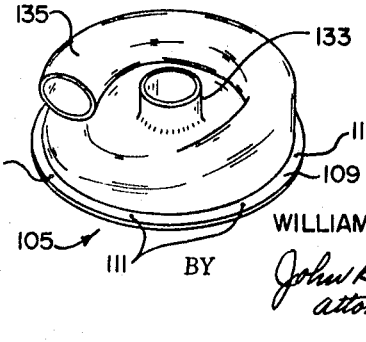

United States Patent Office 3,619,994
Patented Nov. 16, 1971

3,619,994
MANUALLY DIRECTED COTTON HARVESTING MACHINE
William E. Rohde, 2849 Invergarry Road,
Memphis, Tenn. 38128
Filed Dec. 4, 1969, Ser. No. 882,040
Int. Cl. A01d 45/20
U.S. Cl. 56—13.1
16 Claims

ABSTRACT OF THE DISCLOSURE

A cartlike machine to be used in harvesting seed cotton. The machine includes a centrifugal air blower powered by an internal combustion engine, a self-propelled mobile carriage assembly having a semi-automatic propulsion system which is actuated as the workman progresses along the row of cotton plants, a bifurcated hand-held nozzle assembly for pulling the cotton locks from the cotton boll and a receptacle bag which trailingly follows the machine.

BACKGROUND OF THE INVENTION

(1) Field of the invention

This invention relates to agricultural equipment and more particularly to a relatively small cotton picking machine that is self-propelled and develops a powerful rushing air current which is directed by an individual to the cotton bolls and utilizes the rushing air to pull the cotton locks from the cotton bolls.

(2) Descritpion of the prior art

The oldest and in many respects still superior method used for harvesting seed cotton is that of picking by hand. Hand picked cotton is higher quality because: The staple is generally longer which brings a higher price per unit weight, cleaner, void of debris and the cotton seed remains undamaged. Additionally, the yield per acre is higher because the individual picks all the cotton locks, leaving the plant much cleaner than does the cotton picking machines commonly in use today. Hand picking is slow and the quantity harvested per man is relatively low as it involves a person walking between the rows of cotton plants dragging behind him an elongated bag which he fills as he tiringly bends over the plant picking cotton locks from the cotton boll placing same in the bag. Many cotton fields are still picked in this manner, but the hand cotton picker is finding it more difficult to compete with the large tractorlike cotton picking machine. A search of the prior art revealed the following U.S. patents:

| Re. 15,855 | 1,256,438 | 851,475 |
| 1,844,785 | 988,566 | 2,531,041 |
| 1,096,325 | 2,957,534 | 2,521,491 |
| 2,785,522 | 3,174,265 | |

SUMMARY OF THE INVENTION

Thousands of people, who made their living picking cotton have been replaced in recent years by large tractorlike cotton pickers. These people are finding it necessary to relocate and adapt themselves to some other gainful employment. Many remain totally unemployed and this invention is intended to benefit these people. More specifically, the present invention is directed towards making avaliable to the individual cotton picker and the small cotton farmer a small inexpensive, lightweight and highly efficient cotton picking machine. A machine that will harvest seed cotton which will resemble hand picked cotton, i.e., generally be of higher quality, have extra staple, cleaner cotton—substantially void of debris, and the cotton seed will not be cracked or crushed. Cotton of this quality brings the grower more money per unit weight, tending to compensate for the lesser quantity harvested in comparison with the large tractorlike cotton pickers. Additionally, the cotton picker of the present invention is simple and inexpensive to operate as well as reliable and requiring little or substantially no maintenance. My cotton picker will pick substantially all the cotton locks leaving the plant clean, as does the hand picker, resulting in higher yield per acre to the grower. Accordingly, it will enable a lone individual to so greatly increase his hourly rate of harvest that when combined with the above advantages, he may be competitively employed in the cotton harvesting market.

An object of this invention is to provide a highly maneuverable lightweight machine that may be utilized in soft or uneven terrain which restricts the use of large tractorlike cotton pickers. One that could easily be purchased by the small cotton farmer and, more important, by an individual cotton picker with the object being to increase his hourly harvest more abundantly.

An important feature of this machine is the semi-automatic propulsion system. This system is placed in standby operation by the workman buckling a belt around his waist. The belt has a lanyard fixed thereto which is attached to a clutch assembly that engages the driving mechanism. The driving mechanism propels the cotton picker forward as the workman advances forward and causes it to cease traveling when the workman stops, as he would when going from one plant to the next. This feature frees the two hands of the workman substantially at all times enabling him to use them to vigorously harvest cotton, in a manner yet to be described.

Another feature of this machine is the innovative centrifugal air blower which is powered by a conventional internal combustion engine. The blower provides a vacuum suction at the eye and a positive air pressure exhaust which is in communication with the receptacle bag for the accumulation of the cotton harvest. Particular innovations in the air blower design include injecting the air and cotton along a vertical axis, against gravity, at the ambient vacuum speed at the center of the impeller. Movement against gravity tends to decelerate the cotton locks as they pass into the eye of the centrifugal air blower. The linear speed of the rotating impeller on the axis is zero and increases proportionately with the distance from the axis. The closer the center of the rotating impeller the cotton locks are injected, the slower the angular velocity. Accordingly, damage to the cotton seed and breaking of the staple is substantially nil as it collides with the center portion of the proposed rotating impeller. The air flow is deflected by the impeller and the direction is changed to the horizontal axis. Here the velocity of the air flow is increased by the rotational motion of the blades of the impeller which imparts a centrifugal force on the air and the cotton locks that have been injected. The curved design of the impeller assembly gives a rolling action to the cotton locks. A further curvature on the outer edges of the impeller blades with an expanding and downwardly spiralling curvature in the blower housing insures imparting a rolling motion to the cotton staple as opposed to a direct collision with the housing, as does earlier cotton pickers, with a resultant diminution of damage to the cotton seed. After passing through the impeller stage of the air blower, the high velocity air flow carries the seed cotton through appropriate tubing to a receptacle bag. The rolling action imparted to the seed cotton causes it to form into little ball-like particles which substantially obviates the likelihood of blockage in the tubing leading to the receptacle bag and aids in eliminating damage to the cotton seed.

Still another feature of this machine is the bifurcated inlet assembly providing a wand for each hand. The preferred design is that one wand be straight and the other suitably curved to enable the workman, from a standing position, to pick two rows of cotton with one pass between them. The straight wand would be used more or less to pick from the near side of both rows. The curved wand would reach the cotton bolls on the opposite side of both rows. The rushing air current at the mouth of the nozzle is sufficient to draw the cotton locks from the cotton boll.

BRIEF DESCRIPTION OF THE DRAWING

FIG. 1 is a side elevational view of the present invention showing the position of the workman with respect to the device and the cotton plant.

FIG. 2 is a side elevational view with the shroud, receptacle bag and bifurcated inlet nozzle assembly removed.

FIG. 3 is a perspective view of the shroud assembly.

FIG. 4 is an enlarged view of the actuating linkage for the propulsion system.

FIG. 5 is a top plan view of the internal combustion engine and the driving apparatus, with the shroud removed.

FIG. 6 is a sectional view taken as on line VI—VI of FIG. 5.

FIG. 7 is a plan view of the impeller.

FIG. 8 is a sectional view taken as on line VIII—VIII of FIG. 7.

FIG. 9 is a perspective view of the lower section of the air blower, shown in an inverted position, clearly showing the eye and the exhaust ports and the relationship therebetween.

DESCRIPTION OF THE PREFERRED EMBODIMENT

The cotton picker of the present invention designated by the numeral 11 is a lightweight transportable, motorized machine operated by a workman 13 as he walks in a cotton field preferably between the rows harvesting a crop of seed cotton 15 by pulling it from a cotton boll 17 which grows on a cotton plant 19. The cotton picker 11 includes a centrifugal air blower 21 powered by a conventional internal combustion engine 23 (FIGS. 2 and 6), a self-propelled mobile carriage assembly 25 (FIG. 2), a bifurcated hand-held nozzle assembly 27 (FIG. 1) and a canvas-like receptacle bag 29 (FIG. 1).

The carriage assembly 25 is covered by a shroud assembly 31 shown detached in FIG. 3 exposing the structure of the carriage assembly 25. The carriage assembly 25 formed of tubular steel or the like has a wishbone-like structure straddling the air blower assembly 21 and the engine 23. The wishbone-like structure of the carriage assembly 25 having two legs 33, 35 has lines sweeping forwardly and upwardly with legs 33, 35 converging at a junction 37 and continuing to extend forwardly and upwardly but in a parallel relationship to an offset bend 39, thence extending forwardly and horizontally in a parallel relationship terminating a short distance therefrom. Looking at the carriage assembly 25 from the side as in FIG. 2, it has the appearance of a typical offset bend with upper offset bend 39 and lower offset bend 41 having a substantial parallel relationship and positioned horizontally. The carriage assembly 25 also includes a bowed transversal member 43 which is formed of tubular steel or the like and joins the two legs 33, 35 adjacent the trailing ends aft of the lower offset bend 41. The transversal member 43 fixedly attached in a suitable manner such as by welding to the legs 33, 35 extends from the ends of legs 33, 35 upwardly and vertically hence transversely forming a bowlike structure. Also included in the carriage assembly 25 is a mounting platform 45, which is a horizontally positioned plate-like member formed of any suitable material as rigid sheet steel or the like and has a rather large aperture 47 which receives a drive shaft 49 and facilitates installation of the engine 23 on the top side 45' and the air blower 21 on the bottom side 45" of the mounting platform 45. Included in the mounting platform 45 are a plurality of apertures 55 which receive mounting bolts-nuts 57 for securing the air blower 21 and the engine 23 to the mounting platform 45, as best viewed in FIGS. 5 and 6. A pair of angleiron support members 59, 61 support the mounting platform 45 and are suitably attached in a manner yet to be described to the carriage assembly 25. The support members 59, 61 are positioned parallel one with the other and with the one face of each being horizontal and the other face of each being vertical and with the two vertical faces opposing one another inwardly and the two horizontal faces projecting outwardly. With support members 59, 61 positioned as above, they are fixedly attached, as by welding or the like, at the forward ends thereof to the legs 33, 35 respectively and at the rearward ends thereof to the left and right vertical portions of the transversal member 43. It should be understood that support members 59, 61 are mounted to carriage assembly 25 at an elevation which will insure adequate clearance above the ground for the air blower 21 and ancillary appendage. Support members 59, 61 and mounting platform 45 have a plurality of aligned apertures for receiving mounting bolts-nuts 65 which secure the platform 45 to the support members 59, 61.

The rearward end of the carriage assembly 25, is supported by a pair of wire spoke wheels 67, 69 or the like, having an appearance resembling a conventional bicycle wheel but preferably having structure designed to carry a much heavier load. A pair of spindle housings 71, 73 are fixedly attached, as by welding or the like, adjacent the junction of legs 33, 35 respectively and the left and right vertical portions of the transversal member 43. The wheels 67, 69 preferably have solid rubber tires 75, 77 with tread portions having transversal ridges 79 radially arranged so that the outermost circumferences of the wheels 67, 69 resembled gear teeth. Wheels 67, 69 are rotatably attached as with bearing assemblies 83, 83 (only one shown) to suitably tapped apertures (not shown) in spindle housings 71, 73 by use of a pair of shoulder bolts 87, 87. Shoulder bolts 87, 87 also secure a pair of nonrotatable chamfered lug members 91, 91 which extend downwardly from the bolts 87, 87 with the bottom edges rolled outwardly, thus each forming a curved surface 93, 93 which support the lower aft section of the shroud assembly 31.

The internal combustion engine 23 is of conventional design having a separate power takeoff shaft 97 in addition to crankshaft 49 and adequate horsepower to drive the air blower 21 with a suitable r.p.m. and to propel the cotton picker 11. When the engine 23 is cranked and started, the air blower 21 being directly driven from the crankshaft 49 rotates at an r.p.m. proportionately to the engine r.p.m. which is controlled by a typical throttle assembly not shown. A clutch assembly 99 may be actuated which engages and disengages a propelling drive train and facilitates operating the engine 23 without propelling the cotton picker 11, in a manner yet to be described.

The air blower assembly 21 which is secured to the mounting platform 45, in a manner previously described, comprises an impeller 101 (FIGS. 7 and 8) and a housing 102 including upper and lower circular clamshell-like sections 103, 105 respectively. Each section 103, 105 has an annular flange 107, 109 respectively protruding outwardly from the center thereof which has a plurality of apertures 111 symmetrically radially arranged thereon that are suitably aligned to removably join the two together as by bolts-nuts 113. The impeller 101 includes a circular truncated conical main body portion 117 having a concave and convex surface 119, 121, respectively, formed from pressed sheet metal or the like and a plurality of impeller blades 123. The diameter of the truncated end substantially conforms to the large diameter of a frusto-conical spinner 126 which threads on the drive shaft 49 after the impeller retaining nut (not shown) is securely attached. The impeller blades 123 having a substantially kidney-shaped surface and being formed of a suitable material such as aluminum are positioned perpendicular to the plane of the convex surface 121 radially and symmetrically, with the smaller end directed inwardly, with the curved longitudinal axis curving away from the convex surface 121 and with the larger end protruding beyond the periphery of the convex surface 121. Each impeller blade 123 preferably protrudes radially at a distance which causes the tip to tip dimension of two opposing impeller blades 123 to be slightly less than the inside wall to wall diameter of the upper and lower sections 103, 105. The impeller blades 123 are fixedly attached to the convex surface 121 in any suitable manner such as by using an angleiron member 122 with one surface secured to the convex surface 121 by flush rivets 124 and the impeller blade 123 attached to the other surface of the angleiron 122 with flush rivets 124'. It should be understood that FIGS. 7 and 8 depict round head rivets for clarity of illustration. If desired, the impeller blades 123 may be cast integrally with main body portion 117 out of suitable material, such as metal or plastic. The spinner 126 and flush rivets 124, etc., are intended to preclude the possibility of cotton catching or hanging onto faceted surfaces. Accordingly, the angleiron members 122 preferably will be tapered at the edges to present a smooth uninterrupted trailing surface. The arrow in FIG. 7 depicts the preferred direction of rotation which shows all angleiron members 122 leeward.

The interior surface of the upper section 103 has a circular bowl-like shape having a cross section slightly larger but resembling the cross sectional shape of the impeller 101, as viewed in FIG. 6. The upper section 103 includes a relatively large concentric aperture 125 for admitting the drive shaft 49 and a plurality of considerably smaller apertures 127 symmetricaly arranged adjacent the periphery of the aperture 125, which receive mounting bolts 57 as previously described. The lower section 105 has a circular interior with the side walls curving inwardly and downwardly to a bottom portion 129 then having a reverse curve extending inwardly and upwardly to a concentric inner contour or ridge 131 thence another reverse curve extending inwardly and downwardly forming a concentric vertical orientated annular nipple 133 which is the intake eye for the air blower 21. The curved bottom portion 129 has a downward spiralling plane and accordingly an ever increasing height of the side walls, i.e., the outermost concentric circular interior wall and the substantially opposing surface or wall formed by the reverse curve are gradually closing in as the spiral continues downward eventually forming a horizontal annular convolute nipple 135 which is the exhaust for the air blower 21.

A rigid conduit or nipple 137 (FIG. 2), joined to the exhaust nipple 135, is secured with a friction fitted collar 143 and extends forward to a 90° elbow 141 which is orientated with the open end up. A rigid piece of conduit 145 is telescopically attached to elbow 145 as by friction and extends vertically upward to a second 90° elbow 147 which is telescopically attached as by friction and is orientated with the opening facing to the rear where a second rigid conduit 149 is telescopically attached as by friction and extends rearward, terminating just beyond and adjacent the rearwardmost appendage of the cotton picker 11. Support structure 151 being formed from angleiron or the like and having a bowlike shape comprising a horizontal portion 153 (FIG. 5) and two vertical legs 155, 157 is positioned aft of the engine 23 and is fixedly attached as by welding or the like to the vertical faces of the support members 59, 61. Conduit member 149 rests on the horizontal portion 153 of the support structure 151 and is removably attached thereto as with clamp 159. An elongated flexible conduit 161 is removably attached as by a typical clamp, not shown, to the intake nipple 133 of the blower 21 and extends downwardly, thence rearwardly, thence upwardly, thence forwardly over the horizontal portion 153 of the support structure 151, thence forward and terminating adjacent the offset bend 39. A pair of clamps 165, 167 removably secure the flexible conduit 161 to the horizontal portion 153 of support structure 151 and to the uppermost portions of carriage assembly legs 33, 35 adjacent the offset bend 39 respectively.

A Y-fitting 169 preferably having reduced branches 171, 172 is attached to the flexible conduit 161 adjacent the offset bend 39 with a clamp 175. Two elongated lengths of flexible conduit 177, 179, each having a substantially smaller inside diameter than does conduit 161, are fitted at one of the ends thereof to branches 171, 172 of the Y-member 169 as with clamps 181, 183. Flexible conduits 177, 179 extend forwardly and are frictionally secured to a pair of hand-held elongated tubular wands 185, 187 which are directed by the workman 13 while he performs the task of harvesting seed cotton 15. The wand 185 is preferably straight and the second wand 187 is suitably curved as at 187' to enable the workman 13, from a standing position, to pick a single row of cotton from both sides. Wands 185, 187 respectively have open cotton receiving ends 189, 191, respectively. The straight wand 185 would be used more or less to pick from the near side of the row, and the curved wand 187 from the far side of the row.

The elongated receptacle bag 29, formed of canvas or the like preferably having a double thickness 195 on the surface which drags on the ground and an insert 197 of loose woven material such as nylon screen on the upper surface for readily allowing free air passage, is removably attached as by clamp 199 to the protruding end of the conduit member 149.

The shroud assembly 31 moves the protruding foliage of the cotton plants 19 laterally away from the cotton picker 11, thus precluding entanglement of the plants 19 with the wheels 67, 69 or any other appendage. The shroud assembly 31 also supports the forward end of the carriage assembly 25 and extends rearwardly expanding outwardly covering the forward appendage and the wheels 67, 69. The shroud assembly 31 (FIG. 3) comprises a tubular steel frame 201, sheet metal covering 203 and a forward rotatably attached solid rubber tired disc wheel 205. The frame 201 includes an upper horizontal member 207 having structure of two diverging offset portions 209, 211 joined together at right angles with a horizontal transversal portion 213. The frame 201 also includes left and right vertical members 215, 217 respectively which have ends 215', 217' fixedly attached as by welding to the rearwardmost portion of the horizontal member 207. The members 215, 217 extend in a parallel relationship downward and rearward, thence curve gently downward and forward and then extend horizontally forward, thence converge forming a pair of converging offsets which maintain a substantially parallel relationship to the upper horizontal members 207, thence forward forming a horizontal spaced apart parallel relationship with each other at the forwardmost portion 201', thence sharply curving upwardly in a vertical spaced apart parallel relationship to the forwardmost portion 207' of the horizontal member 207. The members 215, 217 are fixedly attached at the junction of portion 207' as by welding or the like, thence extend upward and vertical in a parallel spaced apart relationship terminating a short distance beyond at ends 215'', 217'' respectively.

The disc wheel 205 having considerably smaller diameter than do wheels 69, 69 is positioned between the lower horizontal parallel spaced apart relationship tubular members 215, 217 adjacent the forwardmost portion 201' and is rotatably attached with an axle 219. The upper ends 215", 217" have apertures 221, 223 respectively which are aligned with aperture 225 in the carriage assembly legs 33, 35 adjacent the junction 37. A bolt-nut 224 removably secures the forward end of the shroud assembly 31 to the carriage assembly 25 by being inserted through apertures 221, 223, 225. A pair of apertures 227 are drilled vertically in the transversal member 213 and are aligned with a pair of apertures 229 drilled vertically in the bowed member 43 and a pair of bolt and nuts, not shown, removably secure the aft portion of the shroud assembly 31 to the carriage assembly 25. It should be understood that the non-rotatable lug members 91, 91 aid in securing the lower aft portion of the shroud assembly 31 in a manner previously described. The sheet metal covering 203 is shaped to conform to the two sides of the frame 201 and is removably attached thereto with typical sheet metal screws (not shown) inserted through random holes drilled in the margin of the covering 203 which are aligned with holes drilled in the frame 201.

A semi-automatic propulsion system 235 is placed in standby operation by the workman 13 buckling a belt 237 around his waist. The belt 237 has a lanyard 239 fixed thereto which is attached to a clutch assembly 99 which engages the driving mechanism 243 (FIGS. 1 and 6). The driving mecahnism 243 includes a sprocket wheel 245 which is keyed to the power takeoff shaft 97, a sprocket wheel 247 which is rotatably driven by a drive chain 249 engaging the sprocket wheel 245. The driving mechanism 243 also includes a transversal drive shaft 251 which is caused to rotate by being secured to the sprocket wheel 247 preferably by a shear pin (not shown). The drive shaft 251 being journaled with a pair of bearings 255, 255 causes a pair of gears 257, 259, which are secured at the ends thereof by a pair of shear pins (not shown), to rotate. The gears 257, 259 having teeth substantially conforming to the transversal ridges 79 on the tread of the tires 75, 77 are formed from fiber or the like and may be meshed with the ridges 79 to cause the wheels 67, 69 to rotate propelling the cotton picker 11 in a forward direction.

The clutch assembly 99, which engages and disengages the driving mechanism 243, includes a fore and aft sliding member 261 which has an elongated aperture 263 and is slidably secured to the carriage assembly 25 adjacent the bend 39 by a pair of shoulder bolts-nuts 265. The sliding member 261 includes a downward protruding grip portion 267 and a forward aperture 269 for attaching the lanyard 239 and a rearward aperture, not shown, for pivotally attaching a bell crank 273. The clutch assembly 99, in addition to bell crank 273, also includes a push-pull rod 275 and a bifurcated lever member 277. A shoulder bolt-nut 272 is inserted through an aperture in the bell crank 273 and pivotally secures the one end 273' to the rearward aperture in the sliding member 261. The bell crank 273 is pivotally anchored between the parallel spaced apart legs 33, 35 adjacent the junction 37 and pivots about a pivot bolt 279 which is inserted through an aperture in the legs 33, 35 and a second aperture 285 in the bell crank 273. The push-pull rod 275 having a 90° bend and the form of a clevis at the one end 275' is pivotally attached in a third aperture 287 positioned at the other end 273" of the bell crank 273. Push-pull rod 275 adjacent end 275" is pivotally attached by suitable pivot means, as at 289, to lever member 277. The bifurcated member 277 has a pair of converging legs 297, 299 and a junction portion 293, as viewed in FIGS. 4 and 5. The legs 297, 299 are bent upwardly at the distal ends thereof and are pivotally anchored with a pair of shoulder fulcrum bolts 309, 311 inserted through a pair of apertures 313, 315 in the left and right legs 297, 299 of the lever member 277 and a pair of apertures 317, 319 in the vertical faces of the support members 59, 61 respectively. The proximal ends of legs 297, 299 converge inwardly and are joined at the junction portion 293. The distal ends thereof are fixedly attached as by welding or the like to the two bearings 255 which journal the transversal drive shaft 251. A pair of pull springs 321, 323 are swingably attached at the one end to a pair of eyebolts 325, 327 which are secured in a pair of apertures in the support structure 153. The other ends of springs 321, 323 are swingingly attached in apertures 329, 331 in the bearing housings 256, 256' urging the distal ends of the lever member 277 upwardly, thus disengaging the gears 257, 259 from the ridges 79 on the tread of the tires 75, 77.

From FIG. 4 of the drawings, it may be seen that pulling forward or movement to the right of the grip portion 267 causes the sliding member 261 to move to a position as indicated by broken lines. This causes the bell crank 273 to rotate clockwise, as shown in broken lines, which pulls the push-pull rod 275 upwardly. This causes the bifurcated lever member 277 to rotate counterclockwise about a pair of fulcrum bolts 309, 311 to a position shown in broken lines, thus overcoming the spring tension of the pull springs 321, 323 and engaging the gears 257, 259 with ridges 79 on the tires 75, 77 of the wheels 67, 69.

In operation, the cotton picker 11 is preferably transported to the cotton field by a small truck or the like and is assembled as described above and substantially as depicted in FIG. 1. The engine 23 is cranked and started, which immediately causes the air blower 21 to rotate. A typical throttle assembly (not shown) is adjusted for the desired r.p.m., which may tend to inflate the receptacle bag 29. The blower 21 develops a suction or a strong current of inward rushing air adjacent the nozzles 189, 191 creating a strong suction for pulling the seed cotton 15 from the cotton bolls 17. It should be understood that the semiautomatic propulsion system 235 may be placed in standby operation by the workman 13 buckling a belt 237 having a connecting means or lanyard 239 attached around his waist or the cotton picker 11 may be self-propelled manually by the grip 267. Assuming that the workman 13 chooses to use the semi-automatic propulsion system, he fastens the belt 237 around his waist, and with the two wands 185, 187, one in each hand, he directs the nozzles 189, 191 towards cotton bolls 17. The vacuum pulls the seed cotton 15 from the cotton bolls 17 and since the nozzles 189, 191 are in communication with the eye 133 of the air blower 21 and the receptacle bag 29 is in communication with the exhaust of the air blower 21, accordingly, the cotton staple 15 is caused to accumulate in the receptacle bag 29. The lanyard 239, being attached to the belt 237 at the one end and to the clutch assembly 99 at the other end, pulls the sliding member 261 forward as the workman 13 steps forward. This movement of the sliding member 261 engages the driving mechanism 243 in a manner previously described and propels the cotton picker 11 forward as the workman 13 advances forward and causes it to cease travelling when the workman 13 stops, as he would when going from one plant to the next. Preferably, the lanyard 239 would be of suitable length to allow the forward momentum of the cotton picker 11 to cancel out, causing the cotton picker 11 to stop before the forward appendage comes in contact with the workman 13. Additionally, the lanyard 239 preferably would have suitable length to provide the workman 13 with a reasonable degree of maneuverability and not cause the driving mechanism 243 to become engaged, i.e., as for example, in shifting positions like moving from a row on the left to a row on the right, etc. It should be further understood that the straight wand 185 is preferably used to pick from the near side of the row and the curved wand 187 is preferably used to reach the cotton bolls 17 on the opposite side of the row.

Although the invention has been described and illustrated with respect to a preferred embodiment thereof, it is to be understood that it is not to be so limited since changes and modifications may be made therein which are within the full intended scope of this invention.

I claim:

1. A cotton harvesting machine comprising a carriage, wheel means movably supporting said carriage for movement over the ground between rows of cotton to be harvested, tubular wand means having at least one open cotton receiving end, cotton receptacle means; air blower means including a housing having an intake nipple means adjacent the center thereof, an exhaust nipple adjacent the periphery thereof, and impeller means rotatably mounted about a vertical axis in said housing with the center of said impeller means being adjacent said intake nipple means and the periphery of said impeller being adjacent said exhaust nipple means for causing a suction at said nipple means and a pressure at said exhaust nipple means; first conduit means communicating said exhaust nipple means with said receptacle means, second conduit means communicating said wand means with said intake nipple means; and drive means rotatably driving said impeller means for causing air to be sucked in through said cotton receiving end and to move along a path including the interior of said wand means, said second conduit means, said intake nipple means, said housing, said exhaust nipple means, said first conduit means, and into said cotton receptacle means and being adapted to cause cotton to be sucked into said cotton receiving end of said wand means when placed near a cotton boll and to move along said path with the air.

2. The cotton harvesting machine of claim 1 in which said intake nipple means is disposed vertically and directly below the center of said impeller means whereby the air flows vertically upwardly through said intake nipple means towards said impeller means.

3. The cotton harvesting machine of claim 1 in which said wand means includes a pair of tubular wands with one being substantialy straight and the other being curved.

4. The cotton harvesting machine of claim 1 which includes shroud means covering the sides and front of said carriage and having a ground engaging wheel means disposed adjacent the front thereof.

5. The cotton harvesting machine of claim 1 in which said impeller means includes an inverted truncated conical main body portion and a plurality of vertically disposed impeller blades radially mounted on the lower surface of said main body portion.

6. The cotton harvesting machine of claim 5 in which said impeller blades are each substantially kidney-shaped having a smaller end adjacent the center of said main body portion and a larger end adjacent the periphery of said main body portion.

7. The cotton harvesting machine of claim 6 in which said housing includes a downwardly spiraled bottom terminated in said exhaust nipple means.

8. The cotton harvesting machine of claim 1 in which said drive means includes motor means mounted above said blower means and having a vertical drive shaft upon which said impeller means is mounted.

9. A cotton harvesting machine of claim 8 in which said motor means includes a power takeoff shaft, and in which is included a propelling drive mechanism movable between an engaged disposition in which said power takeoff shaft is coupled to said wheel means for movably driving said carriage and a disengaged disposition in which said power takeoff shaft is uncoupled from said wheel means, and clutch means for selectively moving said drive mechanism between said engaged and disengaged dispositions.

10. The cotton harvesting machine of claim 9 in which said clutch means includes a sliding member slidably mounted from said carriage for sliding movement between forward and rearward positions, a lever pivotally mounted relative to said carriage, said propelling drive mechanism being mounted on one end of said lever, means connecting said sliding member to the other end of said lever from said drive mechanism for actuating said drive mechanism to said engaged position when said sliding member is in said forward position and to said disengaged position when said sliding member is in said rearward position.

11. The cotton harvesting machine of claim 10 which includes a handgrip attached to said slide member for the movement thereof.

12. The cotton harvesting machine of claim 10 which includes a belt for attachment to the waist of the operator of the cotton picker and connecting means connecting said belt to said sliding member for causing said sliding member to move to a forward position when the operator moves forwardly relative to said cotton harvesting machine to cause engagement of said drive mechanism with said wheel means.

13. A cotton harvesting machine comprising a carriage, wheel means movably supporting said carriage for movement over the ground between rows of cotton to be harvested, tubular wand means having at least one open cotton receiving end; a cotton receptacle bag adapted to be dragged on the ground and including an air exhaust means therein; air blower means including a housing having an intake nipple means adjacent the center thereof and vertically depending therefrom, an exhaust nipple means adjacent the periphery thereof, an impeller rotatably mounted about a vertical axis in said housing concentric with said intake nipple means and thereabove and with the center of said impeller means being adjacent said intake nipple means and the periphery of said impeller being adjacent said exhaust nipple means for causing suction at said intake nipple means and pressure at said exhaust nipple means, said impeller including an inverted truncated conical main body portion and a plurality of vertically disposed impeller blades radially mounted on the lower surface of said main body portion, said impeller blades each being substantially kidney-shaped and having a smaller end adjacent the center of said main body portion and a larger end adjacent the periphery of said main body portion, said housing including a downwardly spiraled bottom terminating in said exhaust nipple means, first conduit means communicating said exhaust nipple means with said receptacle means, second conduit means communicating said wand means with said intake nipple means; and drive means rotatably driving said impeller means for causing air to be sucked in through said cotton receiving end and to move along a path including said wand means, said second conduit means, said intake nipple means, said housing, and out through said exhaust nipple means, through said first conduit means and into said receptacle means and being adapted to cause cotton to be sucked into said cotton receiving end when placed near a cotton boll and to move along said path with the air.

14. The cotton harvesting machine of claim 13 in which said drive means includes motor means mounted above said blower means and having a vertical drive shaft upon which said impeller means is mounted, said motor means including a power takeoff shaft, and in which is included a propelling drive mechanism movable between an engaged disposition in which said power takeoff shaft is coupled to said wheel means for movably driving said carriage and a disengaged disposition in which said power takeoff shaft is uncoupled from said wheel means, and clutch means for selectively moving said drive mechanism between said engaged and disengaged dispositions, said clutch means including a sliding member slidably mounted from said carriage for sliding movement between said forward and rearward positions, a lever pivotally mounted relative to said carriage, said propelling drive mechanism being mounted on one end of said lever, means connecting said sliding mechanism to the other end of said lever from said drive mechanism for actuating said drive mechanism to said engaged position when said sliding member is in said forward position and to said disengaged position when said sliding member is in said rearward position, a belt for attachment to the waist of the operator of the cotton picker and connecting means connecting said belt to said sliding member for causing said sliding member to move to a forward position when the operator moves forwardly relative to said cotton harvesting machine to cause engagement of said drive mechanism with said wheel means.

15. The cotton harvesting machine of claim 2 in which means is included for horizontally deflecting the vertical air flow from said intake nipple means generally toward said exhaust nipple.

16. The cotton harvesting machine of claim 2 in which means is included imparting a rolling motion to the cotton moving through said housing.

References Cited

UNITED STATES PATENTS 1,691,146    11/1928    Boggs ---------------- 56—32

RUSSELL R. KINSEY, Primary Examiner

U.S. Cl. X.R.

56—31